United States Patent
Jons et al.

(10) Patent No.: US 11,214,500 B2
(45) Date of Patent: Jan. 4, 2022

(54) SPIRAL WOUND ASSEMBLY WITH INTEGRATED FLOW RESTRICTOR AND SENSOR

(71) Applicant: DDP SPECIALTY ELECTRONIC MATERIALS US, LLC, Wilmington, DE (US)

(72) Inventors: Steven D. Jons, Minneapolis, MN (US); Luke Franklin, Minneapolis, MN (US)

(73) Assignee: DDP SPECIALTY ELECTRONIC MATERIALS US, LLC, Wilmington, DE (US)

( * ) Notice: Subject to any disclaimer, the term of this patent is extended or adjusted under 35 U.S.C. 154(b) by 0 days.

(21) Appl. No.: 16/769,449

(22) PCT Filed: Jan. 14, 2019

(86) PCT No.: PCT/US2019/013442
§ 371 (c)(1),
(2) Date: Jun. 3, 2020

(87) PCT Pub. No.: WO2019/140354
PCT Pub. Date: Jul. 18, 2019

(65) Prior Publication Data
US 2020/0392020 A1 Dec. 17, 2020

Related U.S. Application Data

(60) Provisional application No. 62/617,372, filed on Jan. 15, 2018.

(51) Int. Cl.
*B01D 63/10* (2006.01)
*B01D 61/12* (2006.01)
(Continued)

(52) U.S. Cl.
CPC .............. *C02F 1/441* (2013.01); *B01D 63/12* (2013.01); *B01D 61/025* (2013.01);
(Continued)

(58) Field of Classification Search
CPC .. C02F 1/441; C02F 1/44; C02F 1/442; C02F 1/444; B01D 63/12; B01D 61/025;
(Continued)

(56) References Cited

U.S. PATENT DOCUMENTS 4,046,685 A 9/1977 Bray
4,214,994 A 7/1980 Kitano et al.
(Continued)

FOREIGN PATENT DOCUMENTS

CN 106322113 A * 1/2017
CN 106322113 A 1/2017
(Continued)

OTHER PUBLICATIONS

English language machine translation of CN 106322113, 5 Pages. No Date.*
(Continued)

*Primary Examiner* — Pranav N Patel

(57) ABSTRACT

A spiral wound assembly including a pressure vessel including an inner chamber, feed inlet, concentrate outlet and permeate outlet and a spiral wound membrane module located within the inner chamber of the pressure vessel; wherein the assembly is characterized by including:
i) a flow restrictor comprising: a first and second plate in sealing contact with one another; and a fluid channel located between the first and second plate and including a first end in fluid communication with at least one of the concentrate outlet and the permeate outlet, and a second end adapted for discharging fluid from the spiral wound assembly; and
(Continued)

ii) a sensor sheet comprising at least one sensor element located between the first and second plates and in contact with the fluid channel, wherein the sensor sheet is adapted for measuring a property of fluid passing through the fluid channel.

10 Claims, 5 Drawing Sheets

(51) Int. Cl.
    *C02F 1/44* (2006.01)
    *B01D 63/12* (2006.01)
    *B01D 61/02* (2006.01)

(52) U.S. Cl.
    CPC ........ *B01D 63/103* (2013.01); *B01D 2311/16* (2013.01); *B01D 2313/19* (2013.01)

(58) Field of Classification Search
    CPC .............. B01D 63/103; B01D 2311/16; B01D 2313/19; B01D 63/10; B01D 61/12; B01D 63/106; B01D 2311/165; B01D 2311/243; B01D 2311/246; B01D 2313/08; B01D 61/10
    See application file for complete search history.

(56) References Cited

U.S. PATENT DOCUMENTS

| | | |
|---|---|---|
| 4,277,344 A | 7/1981 | Cadotte |
| 4,418,723 A | 12/1983 | Koni et al. |
| 4,795,559 A | 1/1989 | Shinjou et al. |
| 5,119,860 A | 6/1992 | Slovak et al. |
| 5,435,957 A | 7/1995 | Degen et al. |
| 5,503,735 A | 4/1996 | Vinas et al. |
| 5,538,642 A | 7/1996 | Solie |
| 5,919,026 A | 7/1999 | Appleton |
| 6,074,595 A | 6/2000 | Eisberg et al. |
| 6,156,680 A | 12/2000 | Goettmann |
| 6,165,303 A | 12/2000 | Darby et al. |
| 6,299,772 B1 | 10/2001 | Huschke et al. |
| 6,878,278 B2 | 4/2005 | Mickols |
| 6,936,160 B2 | 8/2005 | Moscaritolo et al. |
| 7,017,611 B2 | 3/2006 | Schmitt |
| 7,048,775 B2 | 5/2006 | Jornitz et al. |
| 7,048,855 B2 | 5/2006 | de la Cruz |
| 7,225,683 B2 | 6/2007 | Harnett et al. |
| 7,410,581 B2 | 8/2008 | Arnold et al. |
| 7,875,177 B2 | 1/2011 | Haynes et al. |
| 7,886,582 B2 | 2/2011 | Palacios Donaque |
| 7,951,295 B2 | 5/2011 | Larson et al. |
| 8,043,512 B2 | 10/2011 | Bair et al. |
| 8,142,588 B2 | 3/2012 | McCollam |
| 8,210,042 B2 | 7/2012 | Mickols et al. |
| 8,221,522 B2 | 7/2012 | DiLeo et al. |
| 8,272,251 B2 | 9/2012 | Jons et al. |
| 8,388,848 B2 | 3/2013 | Odaka et al. |
| 8,519,559 B2 | 8/2013 | Konishi et al. |
| 8,568,596 B2 | 10/2013 | Konishi et al. |
| 8,617,397 B2 | 12/2013 | Ikeyama et al. |
| 8,808,539 B2 | 8/2014 | Karabelas et al. |
| 2007/0272628 A1 | 11/2007 | Mickols et al. |
| 2008/0295951 A1 | 12/2008 | Hiro et al. |
| 2008/0308504 A1 | 12/2008 | Hallan et al. |
| 2011/0114561 A1 | 5/2011 | Konishi et al. |
| 2014/0180610 A1 | 6/2014 | Chatterjee et al. |
| 2016/0178418 A1 | 6/2016 | Genosar et al. |
| 2017/0050149 A1 | 2/2017 | Jons et al. |
| 2017/0247266 A1 | 8/2017 | Ning et al. |

FOREIGN PATENT DOCUMENTS

| | | |
|---|---|---|
| EP | 1457460 A2 | 9/2004 |
| EP | 2471591 A1 | 7/2012 |
| JP | 2000/167358 A | 6/2000 |
| JP | 2001/137672 A | 5/2001 |
| JP | 2016/019932 A | 2/2016 |
| WO | 2012/086478 A1 | 6/2012 |
| WO | 2012/117669 A1 | 9/2012 |
| WO | 2014176082 A1 | 10/2014 |
| WO | 2015/047667 A1 | 4/2015 |
| WO | WO2015047667 A1 * | 4/2015 |

OTHER PUBLICATIONS

Drazan, JF., et al., Archimedean spiral pairs with no electrical connections as passive wireless implantable sensors, J. Biomedical Technology and Research, 2014, 1(1):, p. 8.
International Search Report, dated May 7, 2019, for International application No. PCT/US2019/013442, filed Jan. 14, 2019, ISA/EPO, Goers, Bernd Authorized Officer.

* cited by examiner

SPIRAL WOUND ASSEMBLY WITH INTEGRATED FLOW RESTRICTOR AND SENSOR

FIELD

The invention is directed toward spiral wound membrane assemblies suitable for use in liquid separations.

INTRODUCTION

Spiral wound membrane assemblies are used in a wide variety of fluid separations. In a conventional residential embodiment, a single spiral wound reverse osmosis (RO) membrane module ("element") is housed within a pressure vessel that includes a feed (e.g. unfiltered water) inlet, a concentrate (reject) outlet and a permeate (e.g. clean water) outlet. During operation, pressurized feed fluid is introduced into the vessel via the feed inlet, passes through the module and exits the vessel in at least two streams: concentrate and permeate. Spiral wound membrane assemblies are typically designed to operate within a specific range of flux and recovery. In larger RO systems, the applied pressure and reject flow are usually separately controlled to obtain optimized operation and regular cleanings and maintenance operations further contribute to long system life. By contrast, residential RO systems encounter a wide range of feed pressures and quality of operating conditions and minimal system maintenance is performed by end users. Additionally, to accommodate both the variable feed conditions (especially pressure and osmotic strength) and the general desire of end users for high flow, systems may be configured to operate at a high and unsustainable initial flux ("over fluxing"). This in turn leads to premature membrane fouling and scaling. These problems may be exacerbated when operating such systems at high recovery.

A variety of techniques have been described to modify flow distribution of RO modules. For example U.S. Pat. Nos. 5,119,860, 7,017,611 and US2017/0247266 describe the use of flow restrictors to provide resistance to flow of concentrate from an RO module to the drain. US2017/0050149 describes a flow controller (e.g. compliant member, variable area orifice, etc.) located within or fixed to the permeate collection tube that provides a resistance to flow which varies as a function of permeate flow. U.S. Pat. No. 8,043,512 describes a similar system. U.S. Pat. No. 4,046,685 describes a flow restrictor within the permeate pathway of a vessel to allow differentiated streams to be obtained from both ends of the vessel. US 2007/0272628 utilizes a combination of elements having different standard specific flux values to better manage differences in operating conditions across the vessel and embodiments utilize a flow restrictor within the permeate collection tube to isolate liquid from the different types of elements. WO2012/086478 utilizes a resistance pipe fixed within the permeate collection tube of an upstream element to reduce permeate flow. U.S. Pat. No. 7,410,581 describes the use of flow restrictors that can be moved to alternative positions along the permeate collection tubes of interconnected modules. See also JP2000/167358 and JP2001/137672. While no applicability to RO applications is disclosed, U.S. Pat. No. 4,418,723 also describes a flow restrictor.

After operation, fouling and scaling of the modules leads to a reduction in pressure and as consequence, reduced separation performance. Monitoring of pressure or conductivity at one or more locations in the assembly can identify pressure loss and permit an operator to take appropriate measures, e.g. selective replacement of a module, increase pretreatment of feed fluid, use of more aggressive cleaning, etc. A variety of techniques have been developed, see for example: US2014/0180610, U.S. Pat. Nos. 8,808,539, 8,617,397, 8,568,596, 8,519,559, 8,272,251, 8,210,042, 7,886,582, US2011/10114561, WO2012/117669 and JP2016/019932. Similar techniques have also been used on other types of filtration devices, e.g. U.S. Pat. Nos. 6,936,160, 7,048,775 and 8,221,522. More generic flow rate sensors are described in U.S. Pat. No. 7,225,683 and US20160178418. While no applicability to RO systems is described, JP64054220 describes a flow meter including a flow restrictor.

SUMMARY

The invention includes a spiral wound assembly (38) including:
i) a pressure vessel (40) including an inner chamber (39), feed inlet (42), concentrate outlet (44) and permeate outlet (46);
ii) a spiral wound membrane module (2) comprising at least one membrane envelope (4) wound about a permeate collection tube (8) extending along an axis (X) between a first end (13') and a second end (13) and forming an inlet scroll face (30) and an outlet scroll face (32);
wherein the spiral wound membrane module (2) is located within an inner chamber (39) of the pressure vessel with the inlet scroll face (30) in fluid communication with the feed inlet (42), the outlet scroll face (32) in fluid communication with the concentrate outlet (44) and the permeate collection tube (8) in fluid communication with the permeate outlet (46); and wherein the spiral wound assembly (38) is characterized by including:
iii) a flow restrictor (54) comprising:
a) a first (56) and second plate (58) in sealing contact with one another;
b) a fluid channel (62/74) located between the first (56) and second (58) plate and including a first end (64/76) in fluid communication with at least one of the concentrate outlet (44) and the permeate outlet (46), and a second end (66/78) adapted for discharging fluid from the spiral wound assembly (38); and
iv) a sensor sheet (68) comprising at least one sensor element (70/80) located between the first (56) and second (58) plates and in contact with the fluid channel (62/74), wherein the sensor sheet (68) is adapted for measuring a property of fluid passing through the fluid channel (62/74).

BRIEF DESCRIPTION OF THE DRAWINGS

The figures are not to scale and include idealized views to facilitate description. Where possible, like numerals have been used throughout the figures and written description to designate the same or similar features.

DETAILED DESCRIPTION

Reverse osmosis (RO) and nanofiltration (NF) are membrane-based separation processes where pressure is applied to a feed solution on one side of a semi-permeable membrane. The applied pressure causes "solvent" (e.g. water) to pass through the membrane (i.e. forming a "permeate") while "solutes" (e.g. salts) are unable to pass through the membrane and are concentrated in the remaining feed (i.e. forming a "concentrate" solution). Once concentrated beyond their solubility limit, retained salts (e.g. $CaCO_3$) begin to form scale on the membrane. Such scale is especially problematic for long term operation of residential RO systems at high recovery.

The present invention includes a spiral wound module suitable for use in reverse osmosis (RO) and nanofiltration (NF) systems. Such modules include one or more RO or NF membrane envelops and feed spacer sheets wound about a permeate collection tube. RO membranes used to form envelops are relatively impermeable to virtually all dissolved salts and typically reject more than about 95% of salts having monovalent ions such as sodium chloride. RO membranes also typically reject more than about 95% of inorganic molecules as well as organic molecules with molecular weights greater than approximately 100 Daltons. NF membranes are more permeable than RO membranes and typically reject less than about 95% of salts having monovalent ions while rejecting more than about 50% (and often more than 90%) of salts having divalent ions—depending upon the species of divalent ion. NF membranes also typically reject particles in the nanometer range as well as organic molecules having molecular weights greater than approximately 200 to 500 Daltons. For purposes of this description, the term "hyperfiltration" encompasses both RO and NF.

Figure 1:
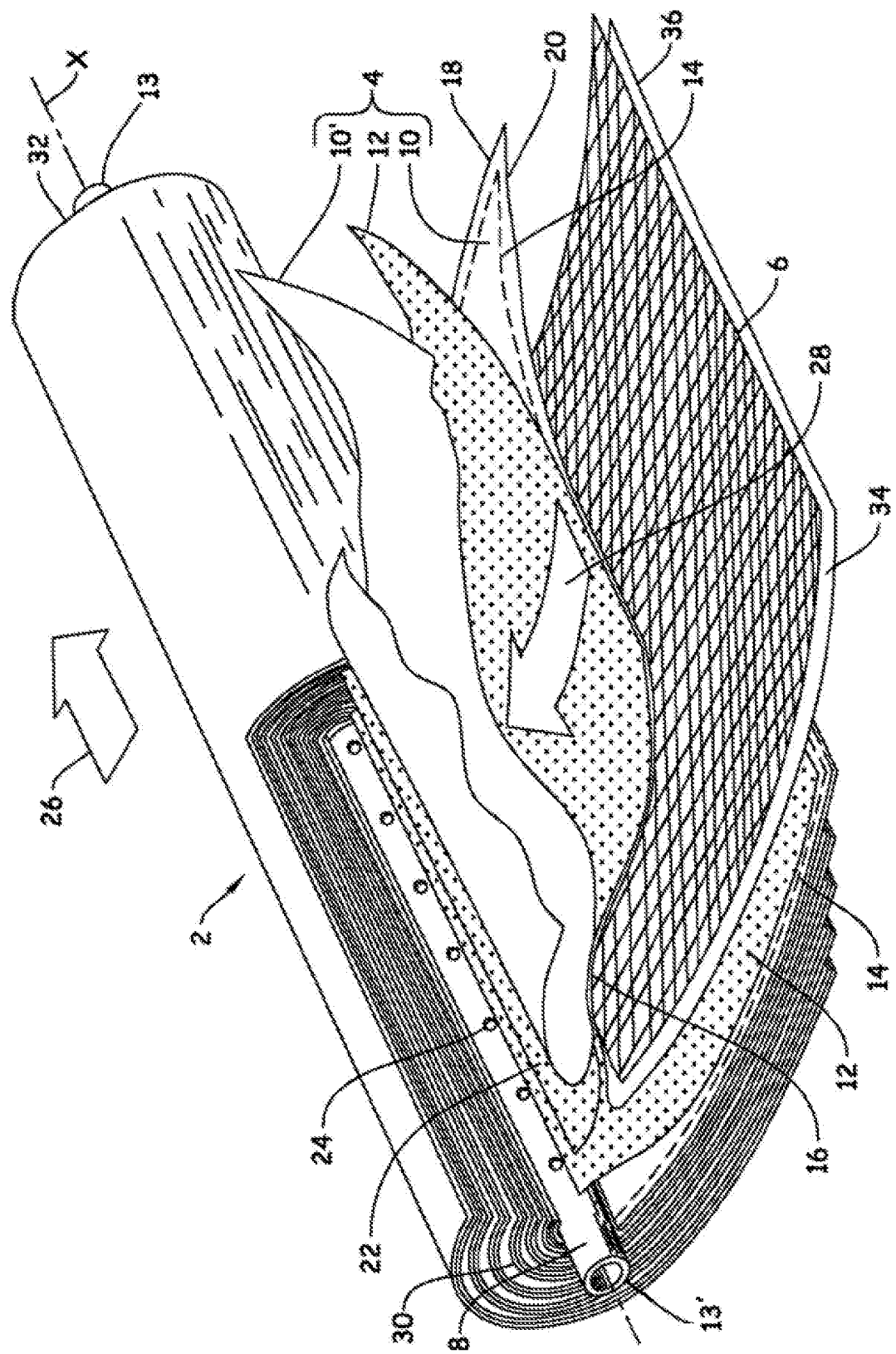
FIG. 1 is a perspective, partially cut-away view of a spiral wound membrane module.

A representative spiral wound membrane module is generally shown at 2 in FIG. 1. The module (2) is formed by concentrically winding one or more membrane envelopes (4) and optional feed spacer sheet(s) ("feed spacers") (6) about a permeate collection tube (8). The permeate collection tube (8) has length extending along an axis (X) between an opposing first and second end (13', 13) and includes a plurality of openings (24) along a portion of its length. Each membrane envelope (4) preferably comprises two substantially rectangular sections of membrane sheet (10, 10'). Each section of membrane sheet (10, 10') has a membrane or front side (34) and support or back side (36). The membrane envelope (4) is formed by overlaying membrane sheets (10, 10') and aligning their edges. In a preferred embodiment, the sections (10, 10') of membrane sheet surround a permeate spacer sheet (12). This sandwich-type structure is secured together, e.g. by sealant (14), along three edges (16, 18, 20) to form an envelope (4) while a fourth edge, i.e. "proximal edge" (22) abuts the permeate collection tube (8) so that the inside portion of the envelope (4) (and optional permeate spacer (12)) is in fluid communication with the openings (24) extending along a portion of the length of the permeate collection tube (8). As used herein, the term "fluid communication" means a sealed pathway adapted for fluid flow. The module (2) may include a single envelope or a plurality of membrane envelopes (4) each separated by a feed spacer sheet (6). In the illustrated embodiment, membrane envelopes (4) are formed by joining the back side (36) surfaces of adjacently positioned membrane leaf packets. A membrane leaf packet comprises a substantially rectangular membrane sheet (10) folded upon itself to define two membrane "leaves" wherein the front sides (34) of each leaf are facing each other and the fold is axially aligned with the proximal edge (22) of the membrane envelope (4), i.e. parallel with the permeate collection tube (8). A feed spacer sheet (6) is shown located between facing front sides (34) of the folded membrane sheet (10). The feed spacer sheet (6) facilitates flow of feed fluid through the module (2). While not shown, additional intermediate layers may also be included in the assembly. Representative examples of membrane leaf packets and their fabrication are further described in U.S. Pat. No. 7,875,177 to Haynes et al.

During module fabrication, permeate spacer sheets (12) may be attached about the circumference of the permeate collection tube (8) with membrane leaf packets interleaved therebetween. The back sides (36) of adjacently positioned membrane leaves (10, 10') are sealed about portions of their periphery (16, 18, 20) to enclose the permeate spacer sheet (12) and to form a membrane envelope (4). Suitable techniques for attaching the permeate spacer sheet to the permeate collection tube are described in U.S. Pat. No. 5,538,642 to Solie. The membrane envelope(s) (4) and feed spacer(s) (6) are wound or "rolled" concentrically about the permeate collection tube (8) to form two opposing scroll faces (inlet scroll face (30) and outlet scroll face (32)). The resulting spiral bundle is held in place by tape or other means. The scroll faces (30,32) of the module may then be trimmed and a sealant may optionally be applied at the junction between the scroll face (30, 32) and permeate collection tube (8) as described in U.S. Pat. No. 7,951,295 to Larson et al. An impermeable layer such as tape may be wound about the circumference of the wound module as described in U.S. Pat. No. 8,142,588 to McCollam. In alternative embodiments, a porous tape or fiberglass coating may be applied to the module's periphery.

In operation pressurized feed liquid (water) enters the module (2) at the inlet scroll face (30) and flows in a generally axial direction through the module and exits as concentrate at the outlet scroll face (32) by arrow (26). Permeate flows along a permeate flow path generally shown by arrow (28) which extends through the membrane (10, 10') and into the membrane envelope (4) where it flows into the openings (24), through the permeate collection tube (8) and exits the second end (13) of the tube (8) at the outlet scroll face (32). The first end (13') of the permeate collection tube (8) is preferably sealed to prevent fluid flow therethrough.

Materials for constructing various components of spiral wound modules are well known in the art. Suitable sealants for sealing membrane envelopes include urethanes, epoxies, silicones, acrylates, hot melt adhesives and UV curable adhesives. While less common, other sealing means may also be used such as application of heat, pressure, ultrasonic welding and tape. Permeate collection tubes are typically made from plastic materials such as acrylonitrile-butadiene-styrene, polyvinyl chloride, polysulfone, poly (phenylene oxide), polystyrene, polypropylene, polyethylene or the like. Tricot polyester materials are commonly used as permeate spacers. In some modules, the permeate collection tube comprises multiple sections and these may be joined together, such as by adhesive or spin welding. Additional permeate spacers are described in U.S. Pat. No. 8,388,848.

The membrane sheet is not particularly limited and a wide variety of materials may be used, e.g. cellulose acetate materials, polysulfone, polyether sulfone, polyamides, polysulfonamide, polyvinylidene fluoride, etc. A preferred membrane is a three layer composite comprising 1) a backing layer (back side) of a nonwoven backing web (e.g. a non-woven fabric such as polyester fiber fabric available from Awa Paper Company), 2) a middle layer comprising a porous support having a typical thickness of about 25-125 μm and 3) a top discriminating layer (front side) comprising a thin film polyamide layer having a thickness typically less than about 1 micron, e.g. from 0.01 micron to 1 micron but more commonly from about 0.01 to 0.1 μm. The backing layer is not particularly limited but preferably comprises a non-woven fabric or fibrous web mat including fibers which may be orientated. Alternatively, a woven fabric such as sail cloth may be used. Representative examples are described in U.S. Pat. Nos. 4,214,994; 4,795,559; 5,435,957; 5,919,026; 6,156,680; US2008/0295951 and U.S. Pat. No. 7,048,855. The porous support is typically a polymeric material having pore sizes which are of sufficient size to permit essentially unrestricted passage of permeate but not large enough so as to interfere with the bridging over of a thin film polyamide layer formed thereon. For example, the pore size of the support preferably ranges from about 0.001 to 0.5 μm. Non-limiting examples of porous supports include those made of: polysulfone, polyether sulfone, polyimide, polyamide, polyetherimide, polyacrylonitrile, poly(methyl methacrylate), polyethylene, polypropylene, and various halogenated polymers such as polyvinylidene fluoride. The discriminating layer is preferably formed by an interfacial polycondensation reaction between a polyfunctional amine monomer and a polyfunctional acyl halide monomer upon the surface of the microporous polymer layer.

The proto-typical membranes for reverse osmosis are FilmTec Corporation's FT-30™ type membranes, made by reaction of m-phenylene diamine and trimesoyl chloride. This and other interfacial polycondensation reactions are described in several sources (e.g. U.S. Pat. Nos. 4,277,344 and 6,878,278). The polyamide membrane layer may be prepared by interfacially polymerizing a polyfunctional amine monomer with a polyfunctional acyl halide monomer, (wherein each term is intended to refer both to the use of a single species or multiple species), on at least one surface of a porous support. As used herein, the term "polyamide" refers to a polymer in which amide linkages (—C(O)NH—) occur along the molecular chain. The polyfunctional amine and polyfunctional acyl halide monomers are most commonly applied to the porous support by way of a coating step from solution, wherein the polyfunctional amine monomer is typically coated from an aqueous-based or polar solution and the polyfunctional acyl halide from an organic-based or non-polar solution.

In operation, the subject spiral wound module is preferably housed within a pressure vessel and defines a spiral wound assembly that includes a feed liquid inlet, concentrate outlet and permeate outlet. Pressure vessels used in the present invention are not particularly limited but preferably include a solid structure capable of withstanding pressures associated with operating conditions. The vessel structure preferably includes a chamber having an inner periphery corresponding to that of the outer periphery of the spiral wound modules to be housed therein. The orientation of the pressure vessel is not particularly limited, e.g. both horizontal and vertical orientations may be used. Examples of applicable pressure vessels, module arrangements and loading are described in: U.S. Pat. Nos. 6,074,595, 6,165,303, 6,299,772 and US2008/0308504. Manufacturers of pressure vessels for large systems include Pentair of Minneapolis Minn., Bekaert of Vista Calif. and Bel Composite of Beer Sheva, Israel. For smaller systems, a molded plastic vessel with a single detachable end cap is commonly used. Also, an encapsulating rigid foam may be molded about the spiral wound membrane module and fitted with fluid inlets and outlets.

The present invention is particular suitable to modules and spiral wound assemblies designed for residential use, e.g. those have less than 5 m$^2$, preferably less than 2 m$^2$ and more preferably less 1 m$^2$ of membrane area. A preferred length for such a module is less than 0.5 m. A representative hyperfiltration module includes FilmTec's 1812 configuration (e.g. TW30-1812), which is nominally 1.8 inches (4.6 cm) in diameter and nominally 12 inches (30 cm) long. In a preferred embodiment shown in FIG. 2, a single module (2) is positioned within the pressure vessel (40) and the assembly includes a single feed inlet, concentrate outlet and permeate outlet. This embodiment is particularly advantaged when connected to a feed pump (e.g. providing at least 400 kPa water pressure to the module at 25° C.) without user-adjustable speed control.

Figure 2:
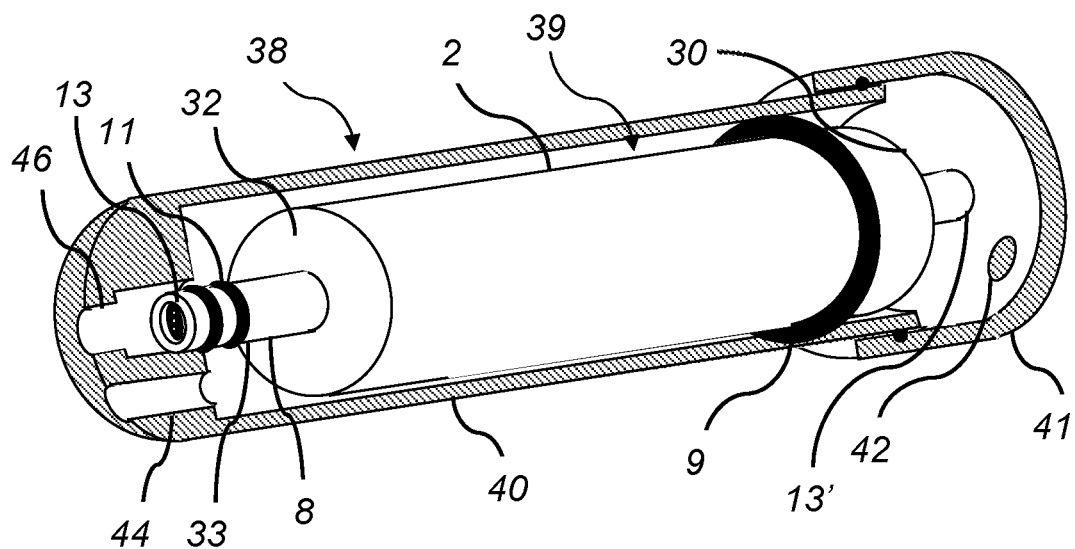
FIG. 2 is a partial cross-sectional view of a spiral wound membrane assembly showing a spiral wound membrane module located within a pressure vessel (housing).

A representative spiral wound assembly is generally shown at 38 in FIG. 2, including a pressure vessel (40) defining an inner chamber (39) along with an end cap (41) that is preferably detachable. The pressure vessel (40) further includes feed inlet (42), concentrate outlet (44) and permeate outlet (46) that provide fluid communication with the inner chamber (39). In particular, the feed inlet (42) is adapted for connection with a pressurized source of feed liquid. The concentrate outlet (44) is adapted for connection to a pathway for re-use or disposal. The permeate outlet (46) is adapted for connection to a pathway for storage, use, or further treatment. In the illustrated embodiment, the spiral wound membrane module (2) is located within the pressure vessel with the inlet scroll face (30) in fluid communication with the feed inlet (42), the outlet scroll face (32) in fluid communication with the concentrate outlet (44) and the second end (13) of the permeate collection tube (8) in fluid communication with the permeate outlet (42). The spiral wound module (2) may further include one or more peripheral brine seals (9) fit against an inner surface of the vessel (40). During assembly, the permeate collection tube (8) is connected to the permeate outlet (46). O-rings (11) are optionally disposed about the tube (8) to perfect as seal with the permeate outlet (46). The length between opposing ends (13, 13') of the permeate collection tube (8) may vary, and may or may not extend beyond one or both scroll faces (30, 32) of a module (2). As shown in FIG. 2, the permeate collection tube (8) may also comprises a coupling extension (33). For purposes of the present invention, the coupling extension (33) is considered part of the permeate collection tube (8).

Figure 3:
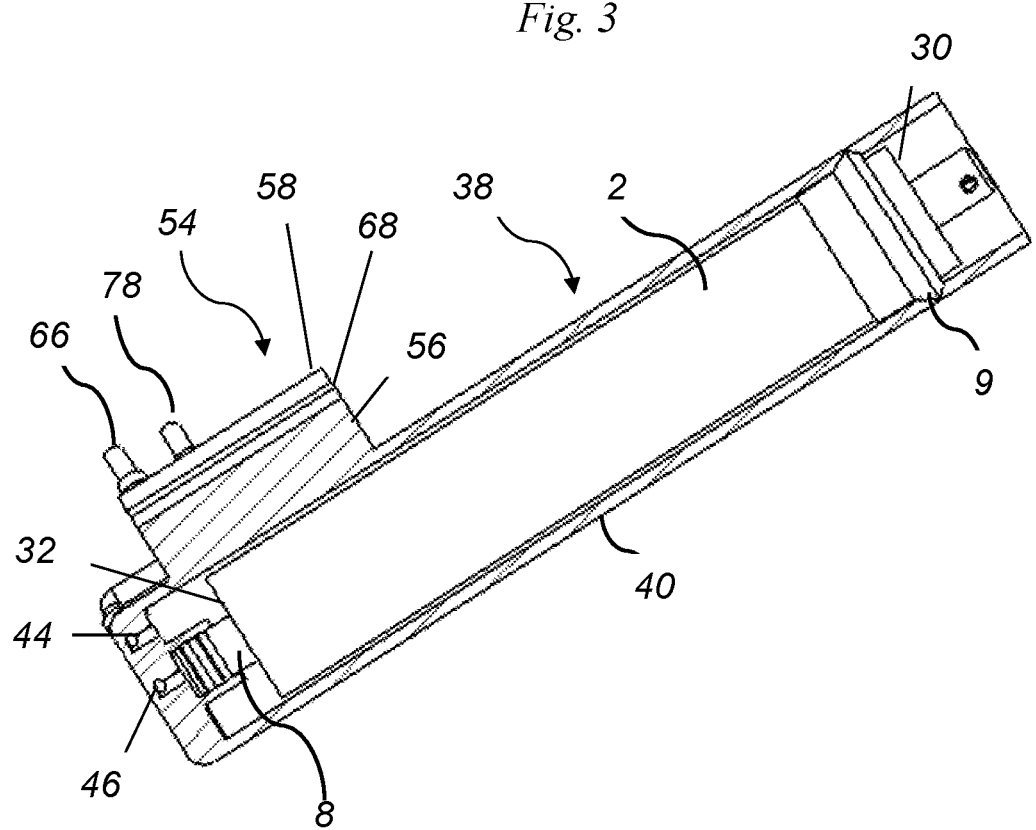
FIG. 3 is a cross-sectional view of a partially assembled (no end cap (41)) spiral wound membrane assembly showing an embodiment of the subject flow restrictor.
Figure 4A:
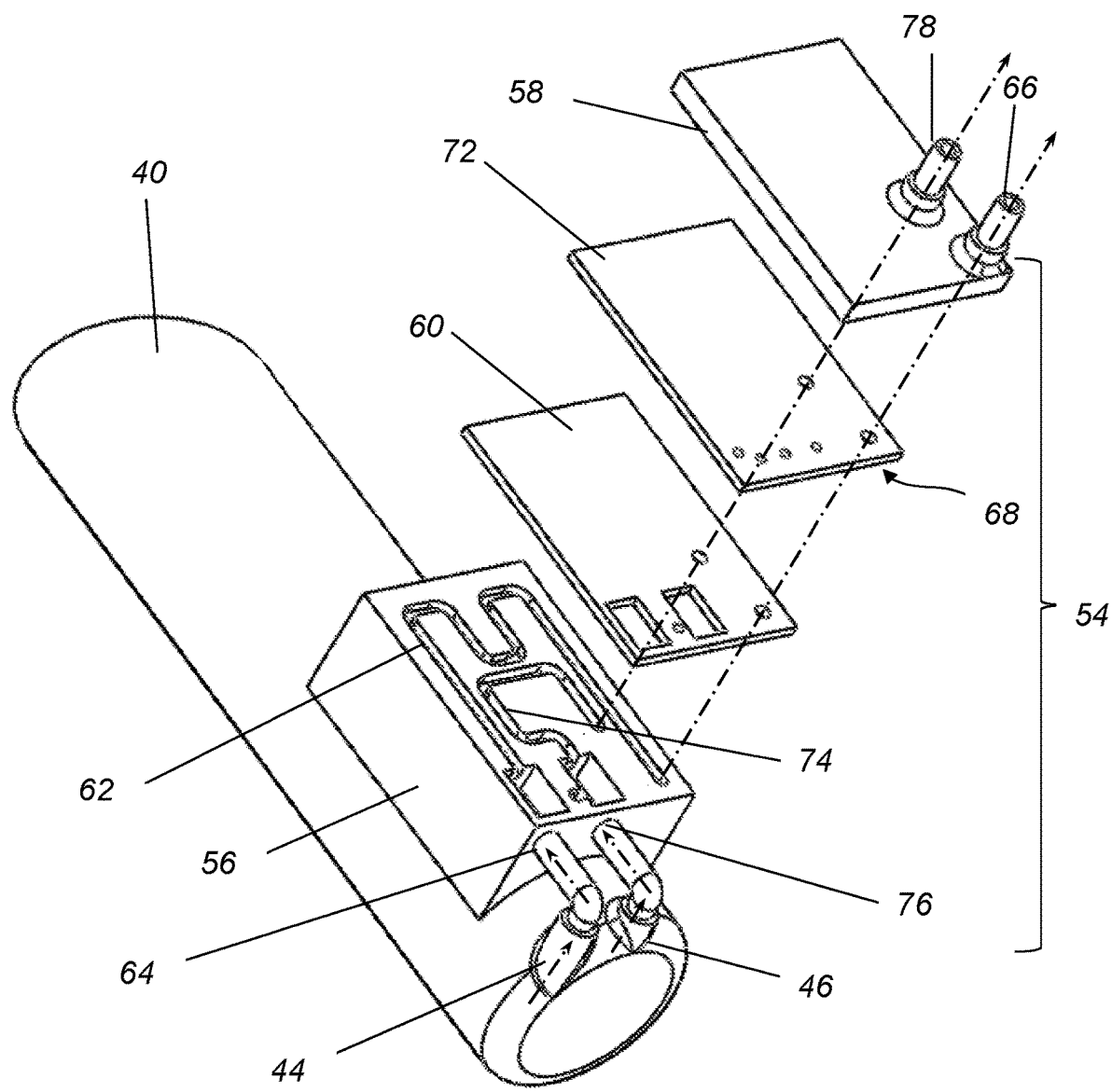
FIGS. 4A-B are perspective exploded and partially cut-away views showing a pressure vessel along with an embodiment of the subject flow restrictor and sensor.
Figure 4B:
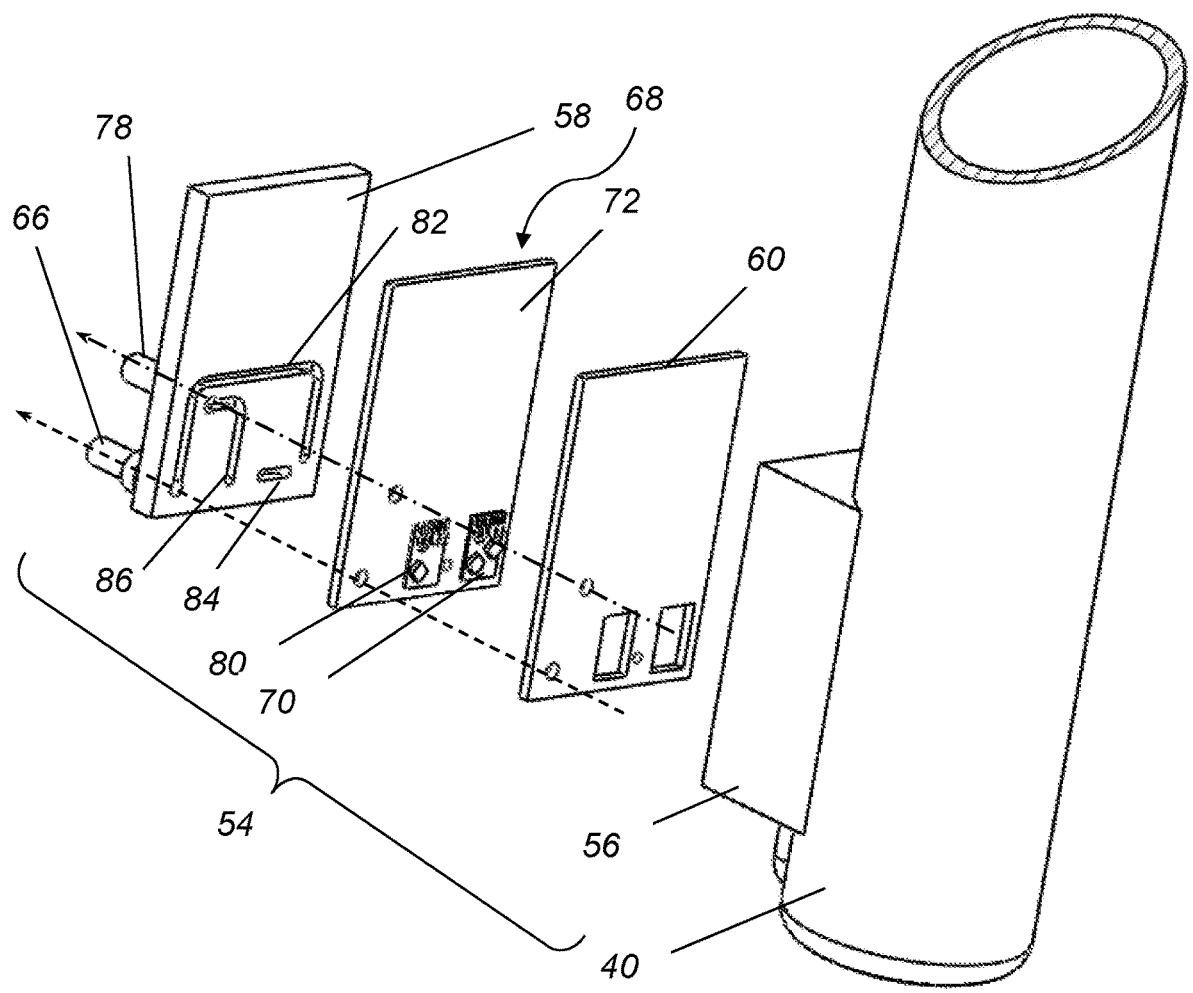

An embodiment of the present invention is generally indicated at 38 in FIG. 3 and FIGS. 4A-B. While similar to the embodiment illustrated in FIG. 2, the embodiments of FIGS. 3 and 4A-B further include a flow restrictor (54) including a first (56) and second plate (58) in sealing contact with one another. The plates (56, 58) preferably include facing planar surfaces sealed against each other. The plates may be secured together via conventional means, e.g. threaded bolts, fasteners, straps, adhesive, etc. In a preferred embodiment as illustrated, the plates are secured to the pressure vessel (40). In another preferred embodiment, one of the plates (56, 58) is integrally formed with the pressure vessel (40). In alternative embodiments not shown, the plates (56, 58) may reside within the pressure vessel, or outside and detached from the pressure vessel.

The flow restrictor (54) further includes at least one fluid channel (62/74) located between the first (56) and second (58) plate, i.e. along the interface between the facing surfaces. The fluid channel(s) may be formed using conventional techniques. For example, the flow channel may be carved, drilled, molded or embossed into one or both plates (56, 58). The fluid channel has a first end (64/76) in fluid communication with at least one of the concentrate outlet (44) and the permeate outlet (46), and a second end (66/78) adapted for discharging fluid from the spiral wound assembly (38). A fluid channel may also include additional outlets or dead-end pthats. In a preferred embodiment, the assembly includes both: (a) a concentrate fluid channel (62) including a first end (64) in fluid communication with concentrate outlet (44) and a second end (66) adapted for discharging fluid from the spiral wound assembly (38) (e.g. to a drain), and (b) a permeate fluid channel (74) including a first end (76) in fluid communication with the permeate outlet (46) and a second end (78) adapted for discharging fluid from the spiral wound assembly (38), (e.g. to a tap).

The flow restrictor (54) is adapted to induce a drop in pressure in the fluid exiting the spiral wound module (2), i.e. in either or both concentrate exiting the concentrate outlet (44) and permeate exiting the permeate outlet (46). The flow restrictor induces a drop in pressure by utilizing fluid channel(s) (62/74) having relatively narrow dimensions as compared with concentrate and permeate outlets (44, 46). The channel's "resistance" (R) to flow may be defined as the ratio of pressure drop ($\Delta p$) to water flow (F) through the fluid channel, i.e. $R=\Delta p/F$. The relationship between pressure drop and flow may be estimated for different channel geometries and under different conditions by known methods (See for example, Sahar, et. al., "Effect of hydraulic diameter and aspect ratio on single phase flow and heat transfer in a rectangular microchannel," Applied Thermal Engineering, 115 (2017), 793-814.) The resistance (R) of a channel may be varied. For long and narrow channels, resistance generally increases linearly with channel length, but non-linearly with hydraulic diameter, e.g. increasing in some cases with the inverse of its forth power. This relationship can be expressed by the pressure loss (drop) Darcy Weisbach equation: $\Delta p = f_D(L/d)(\rho V^2/2)$:

where: $f_D$=darcy friction factor
L=pipe length
D=hydraulic diameter (m)
V=fluid flow average velocity (m/second)
$\rho$=fluid density (kg/m$^3$)

A channel's resistance to flow may be measured at a specific volumetric water flow rate and temperature. For purposes of the present description, the resistance of the concentrate fluid channel (62) is defined at 25° C. and at a water flow rate through the channel (62) equal to the flow of the concentrate stream when the module (2) is operated at a flux of 25 lmh flux with pure water at 25° C. Similarly, the resistance of the permeate fluid channel (74) is defined at 25° C. and at a water flow rate through the channel (74) equal to the flow of the permeate stream when the module (2) is operated at a flux of 25 lmh flux with pure water at 25° C. Resistance to transmembrane flow of a spiral wound membrane module (2) may also be defined as the ratio of its transmembrane pressure drop and permeate flow ($R=\Delta p/F$) when the module is operated at a 25 lmh. This resistance of the module may also be varied, e.g. resistance increases approximately inversely with both the module's active area and the membrane permeability. (A resistance to the flow of feed water that depends on feed spacer geometry could also be defined for spiral wound modules, but it is of less importance for purposes of the present invention.)

When pressurized water is applied to the feed inlet (42) of the pressure vessel (40), flow exiting the vessel is split between the concentration outlet (44) and permeate outlet (46). The ratio of these two flows is determined by the resistance to transmembrane flow of the spiral wound module (2), the resistances to flow of a concentrate fluid channel (62) and/or a permeate fluid channel (74), and by other resistances to water flow within the spiral wound assembly (38). In a preferred embodiment, the concentrate fluid channel (62) provides the majority of resistance to fluid flow between the concentrate outlet (44) and a drain. It is preferable that at least 3 bar (~44 psi) of pressure drop across the concentrate fluid channel (62) results when the spiral wound module (2) within the assembly (38) is operated at 25 lmh flux with pure water at 25° C. The resistance of the concentrate fluid channel (72) is preferably within a factor of three of the resistance to transmembrane flow of the spiral wound module. Most preferably, the resistance of the concentrate fluid channel (62) exceeds the resistance to transmembrane flow of the spiral wound module (2). In some embodiments, when both a concentrate fluid channel (62) and a permeate fluid channel (74) are present on the flow restrictor (54), the resistance of the concentrate fluid channel (62) exceeds the resistance of the permeate fluid channel (74) by a factor of ten or more.

Figure 5:
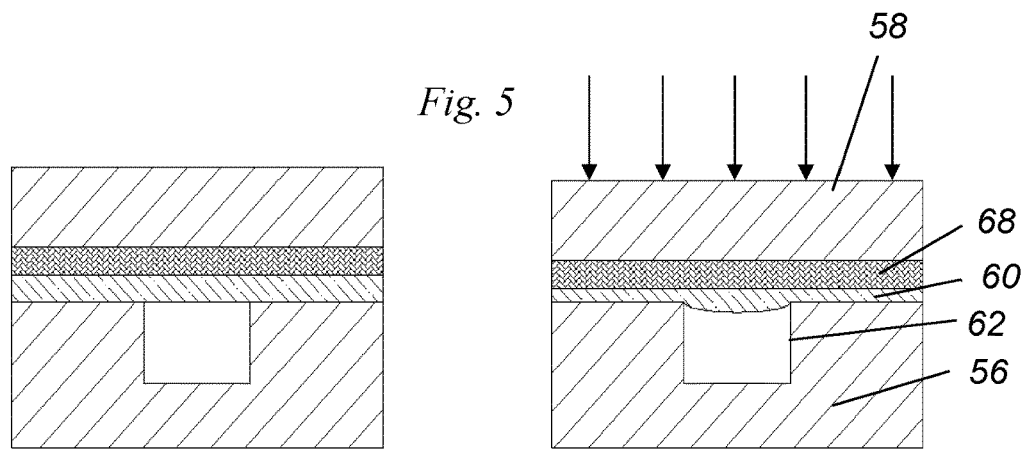
FIG. 5 is a cross sectional view of a fluid channel before and after flow is restricted by compression of a deformable sheet.

The flow restrictor (54) may "variable" in the sense that its resistance to flow may be adjusted. A representative embodiment is illustrated in FIGS. 4A-B and 5 including the use of a deformable sheet (60) located between the first (56) and second (58) plates wherein the deformable sheet (60) is adapted to deform into the fluid channel under compression of the first (56) and second (58) plates to selectively increase or decrease the resistance to flow through the concentrate fluid channel (62). For example, an adjustable clamp, threaded bolts or similar means may be used to selectively adjust the compression of the first and second plates and thereby adjust the degree of deformation of the deformable sheet (60) into the fluid channel (62). Under increased compression, the deformable sheet (60) may increase resistance to flow by restricting the dimensions of the fluid channel FIG. 5 illustrates deformation of sheet (60) into at least a portion of the concentrate fluid channel (62), i.e. constriction of the plates (56, 58) increases resistance to flow through the fluid channel (62). The deformable sheet (60) may alternatively or additionally be used to modify the resistance to flow through the permeate fluid channel (74).

The assembly (38) further includes a sensor sheet (68) for measuring a property of the fluid passing through the fluid channel(s). The sensor sheet (68) includes at least one and preferably two sensor elements (70/80) applied (e.g. printed) or otherwise fixed to a surface (72) of the sheet (86). The sensor element (70/80) is adapted to detect at least one of the pressure, temperature, conductivity or ion concentrations of fluid passing through a fluid channel (62, 74). In preferred embodiments, the surface (72) of the sensor sheet (68) comprises a flexible plastic substrate such as polyimide, polyether ether ketone and polyester. A sensor element (70, 80) may be printed thereon with a conductive ink. Other embodiments of the sensor sheet (68) include flexible printed circuits (FCPs) made via photolithography and flexible foil circuits (FFCs).

The sensor sheet (68) is located between the first (56) and second (58) plates and in contact with the fluid channel(s) (62/74), i.e. adapted to be in contact fluid present within some portion of the channel. In a preferred embodiment, the sensor sheet (68) comprises sensor element (70) in contact with the fluid passing through the concentrate fluid channel (62). In another embodiment, the sensor sheet (68) includes sensor element (80) in contact with fluid passing through the permeate fluid channel (74). In yet another embodiment, the sensor sheet (68) includes both of the aforementioned sensor elements (70/80) for measuring properties of the fluid passing through both the concentrate fluid channel (62) and permeate fluid channel (74). In still another embodiment, the sensor sheet (68) includes two sensor elements (70/80) suitable for detecting relative concentration located near opposite ends of either the concentrate fluid channel (62) or permeate fluid channel (74). The flow rate of fluid passing through the channel may be determined by measuring the difference in time dependence of a change in conductivity or concentration at the two locations.

The sensor element may include one or more additional electrical components, e.g. capacitors, resistors, and electron path (e.g. leads) with power provided from an external source. Alternatively, the sensor element may include an internal power source (e.g. battery) and optional signal transmitter, (e.g. wire leads or wire-free means including for example: cellular, Bluetooth, NFC and WiFi) for transmitting signals from the assembly (38) to a remote receiver. The sensor element may further include a micro-processor and/or memory storage device. Examples of suitable microprocessors include Arduino and Raspberry Pi boards. The microprocessing unit preferably includes flash memory for storing protocol, control functions and data.

The sensor element (70, 80) may be formed using conductive inks which may include a wide range of conductive materials (e.g. conductive polymers, metals, carbon) in various physical forms (e.g. particles, flakes, nanoparticles, nanowires, nanotubes). Commercially available conductive inks include DuPont's PE410 and various inks sold at www.Tekra.com. Adjacent electrodes in contact with a fluid channel (62/74) may be printed for measurement of conductivity. This arrangement may be converted to a sensor element for specific ions by over-coating with a barrier or adsorbent selective to that ion or others. Printed electrodes for sensing concentrations of different constituents by various methods are described in U.S. Pat. No. 8,142,641B2, U.S. Pat. No. 8,703,022B2, US20150276637A1, US20160025517A1, and WO2003012417A2. Printed temperature sensors are described in US20150366608A1, U.S. Pat. No. 7,567,183B2, WO2017122178A1, and KR1669537B1. Printed strain gauges are described in U.S. Pat. No. 5,861,558A, US20160214881A1, and US20070240524A1.

With respect to the measurement of pressure, it will be understood that the pressure of fluid may be measured relative to another region (e.g. the surrounding atmosphere, an enclosed cavity, another fluid channel or to a different region of the same fluid channel) In one embodiment, the sensor element may include a deformable barrier (e.g. diaphram) which provides a simple, reliable, and low cost means to measure differential pressure. Pressure difference across the deformable barrier may result in a change in electrical properties (e.g. resistance, capacitance) and this component may be integrated into electronic circuits to provide a measurement of the differential pressure. Alternatively, deformation of the barrier layer may be detected optically (e.g. by camera or by its deflection or scattering of light) or through modulation of sound. A deformable barrier may also include an antenna that modulates electromagnetic waves to enable passive measurement of different pressure. Examples of powered differential pressure sensors include Omega's PX26-001DV, Dwyer 629C-02-CH-P2-E5-S1, and Cole-Parmer EW-68071-52. In another embodiment, a strain gauge (e.g. Omega's SGD-LY series) including oriented metal wires on a stretchable film may be used. Due to stretching, an increased difference in pressure between regions upstream and downstream results in an increase in the strain gauge resistance. Electrical circuits, which are incorporated as part of the sensor, allow modified electrical properties to be converted to signals read by a microprocessing unit. Alternatively, the change in electrical resistance may be used in an antenna circuit to modulate radio waves and provide a passive (without internal power) measurement of differential pressure. In still another embodiment, deflection of a film including an antenna may be used to detect differential pressure. For example, Drazan, J F., et al., *Archimedean spiral pairs with no electrical connections as passive wireless implantable sensors*, J. Biomedical Technology and Research, 2014, 1(1), page 8; describes a pressure sensor formed from two adjacent spiral antenna, separated by a compressible media.

Figure 6:
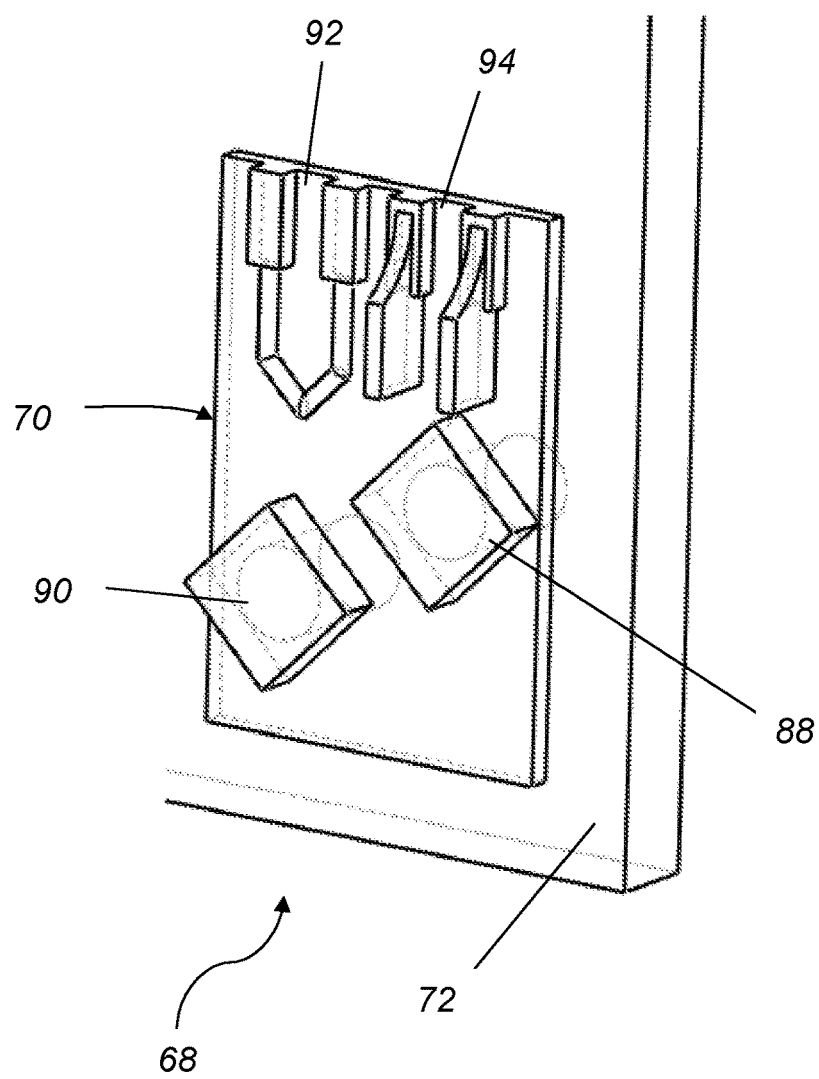
FIG. 6 is an enlarged partially cut-away perspective view showing an embodiment of a sensor sheet.

FIG. 6 illustrates an embodiment of a sensor sheet (68) including sensor element (70) applied to its surface (72). The sensor sheet (68) further includes several sensor components. Symbolic sensor components include a pressure sensor (88) for measuring differential pressure across the concentrate fluid channel, a pressure sensor (90) for measuring the difference in pressure between the first end (64) of the concentrate fluid channel (62) and the first end (66) of the permeate fluid channel (74), a temperature sensor (92) and a conductivity sensor (94). These sensor components may be applied to the surface (72) by various conventional means (e.g. printing, pick-and-place, soldering).

In further reference to FIG. 4A, an embodiment is illustrated showing both a concentrate fluid channel (62) and a permeate fluid channel (74) formed by indents within the first plate (56) of the flow restrictor (54). FIG. 4B illustrates additional indented channel conduits (82, 84, 86) in the second plate (58) that fluidly connect sensor element (70, 80) to the concentrate fluid channel (62) and permeate fluid channel (74). In the illustration of FIG. 4B, channel conduit (82) connects the second end (66) of the concentrate fluid channel (62) to a sensor element (80) that is also in contact with the first end (64) of the concentrate fluid channel (62) to enable the measurement of pressure drop across the concentrate fluid channel (62). Channel conduit (84) connects the first end (66) of the permeate fluid channel (74) to a sensor element (70) that is also in contact with the first end (64) of the concentrate fluid channel (62), and this channel conduit (84) enables the measurement of transmembrane pressure at the end of the spiral wound module (2). Channel conduit (86) connects the second end (78) of the permeate fluid channel (74) to a sensor element (80) that is also in contact with the first end (76) of the permeate fluid channel (74) and this channel conduit (84) enables the measurement of pressure drop across the permeate fluid channel (74). Thus, channel conduits (82, 84, 86) connect the sensor element (70, 80) with the concentrate fluid channel (62) and permeate fluid channel (74).

Many embodiments of the invention have been described and in some instances certain embodiments, selections, ranges, constituents, or other features have been characterized as being "preferred." Such designations of "preferred"

features should in no way be interpreted as an essential or critical aspect of the invention. Expressed ranges specifically include end points.

The invention claimed is:

1. A spiral wound assembly (38) comprising:
   i) a pressure vessel (40) including an inner chamber (39), feed inlet (42), concentrate outlet (44) and permeate outlet (46);
   ii) a spiral wound membrane module (2) comprising at least one membrane envelope (4) wound about a permeate collection tube (8) extending along an axis (X) between a first end (13') and a second end (13) and forming an inlet scroll face (30) and an outlet scroll face (32);
   wherein the spiral wound membrane module (2) is located within an inner chamber (39) of the pressure vessel (40) with the inlet scroll face (30) in fluid communication with the feed inlet (42), the outlet scroll face (32) in fluid communication with the concentrate outlet (44) and the permeate collection tube (8) in fluid communication with the permeate outlet (46); and
   wherein the spiral wound assembly (38) is characterized by comprising:
   iii) a flow restrictor (54) comprising:
      a) a first (56) and second plate (58) in sealing contact with one another; and
      b) a fluid channel (62/74) located between the first (56) and second (58) plate and including a first end (64/76) in fluid communication with at least one of the concentrate outlet (44) and the permeate outlet (46), and a second end (66/78) adapted for discharging fluid from the spiral wound assembly (38); and
   iv) a sensor sheet (68) comprising at least one sensor element (70/80) located between the first (56) and second (58) plates and in contact with the fluid channel (62/74), wherein the sensor sheet (68) is adapted for measuring a property of fluid passing through the fluid channel (62/74).

2. The spiral wound assembly (38) of claim 1 wherein the fluid channel comprises a concentrate fluid channel (62) including a first end (64) in fluid communication with concentrate outlet (44) and a second end (66) adapted for discharging fluid from the spiral wound assembly (38); and wherein the sensor sheet (68) is in contact with the concentrate fluid channel (62) and is adapted for measuring at least one of the pressure, temperature or conductivity of the fluid passing through the concentrate fluid channel (62).

3. The spiral wound assembly (38) of claim 1 wherein the fluid channel comprises a permeate fluid channel (74) including a first end (76) in fluid communication with the permeate outlet (46) and a second end (78) adapted for discharging fluid from the spiral wound assembly (38); and wherein the sensor sheet (68) is in contact with the permeate fluid channel (74) and is adapted for measuring at least one of the pressure, temperature or conductivity of fluid passing through the permeate fluid channel (74).

4. The spiral wound assembly (38) of claim 1 wherein:
   i) the flow restrictor (54) further comprises:
      (a) a concentrate fluid channel (62) including a first end (64) in fluid communication with concentrate outlet (44) and a second end (66) adapted for discharging fluid from the spiral wound assembly (38), and
      (b) a permeate fluid channel (74) including a first end (76) in fluid communication with the permeate outlet (46) and a second end (78) adapted for discharging fluid from the spiral wound assembly (38); and
   ii) the sensor sheet (68) comprises a sensor element (70) fixed upon a surface (72) and in contact with the concentrate fluid channel (62), wherein the sensor sheet (68) is adapted for measuring at least one of the pressure, temperature or conductivity of fluid passing through the concentrate fluid channel (62); and sensor element (80) applied to the surface (72) and in contact with the permeate fluid channel (74), wherein the sensor sheet (68) is adapted for measuring at least one of the pressure, temperature or conductivity of fluid passing through the permeate fluid channel (74).

5. The spiral wound assembly (38) of claim 1 wherein the sensor sheet (68) further comprises a signal transmitter.

6. The spiral wound assembly (38) of claim 1 wherein the sensor sheet (68) further comprises a micro-processor.

7. The spiral wound assembly (38) of claim 2 further comprising a deformable sheet (60) located between the first (56) and second (58) plates; wherein the concentrate fluid channel (62) has a resistance to flow, and wherein the deformable sheet (60) is adapted to deform under compression of the first (56) and second (58) plates to increase the resistance to flow through the concentrate fluid channel (62).

8. The spiral wound assembly (38) of claim 2 wherein the concentrate fluid channel (62) has a resistance to flow, the spiral wound module (2) as a resistance to transmembrane flow, and wherein the resistance to flow of the concentrate fluid channel (62) is greater than the resistance to transmembrane flow of the spiral wound module (2).

9. The spiral wound assembly (38) of claim 2 wherein the resistance to flow of the concentrate fluid channel (62) is within a factor of three of the resistance to transmembrane flow of the spiral wound module (2).

10. The spiral wound assembly (38) of claim 8 wherein the resistance of the concentrate fluid channel (62) exceeds the resistance of the permeate fluid channel (74) by more than a factor of ten.

* * * * *